(12) United States Patent
Yu et al.

(10) Patent No.: US 8,831,440 B2
(45) Date of Patent: Sep. 9, 2014

(54) METHOD AND DEVICE FOR GENERATING OPTICAL SIGNALS

(75) Inventors: Dezhong Yu, Shenzhen (CN); Ming Qi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 336 days.

(21) Appl. No.: 12/969,130

(22) Filed: Dec. 15, 2010

(65) Prior Publication Data

US 2011/0081153 A1  Apr. 7, 2011

Related U.S. Application Data

(63) Continuation of application No. PCT/CN2009/071267, filed on Apr. 15, 2009.

(30) Foreign Application Priority Data

Jun. 20, 2008 (CN) .......................... 2008 1 0128734

(51) Int. Cl.
| | |
|---|---|
| *H04B 10/00* | (2013.01) |
| *H04B 10/04* | (2006.01) |
| *H04B 10/12* | (2006.01) |
| *H04B 10/556* | (2013.01) |
| *H04B 10/50* | (2013.01) |
| *H04B 10/516* | (2013.01) |

(52) U.S. Cl.
CPC ...... *H04B 10/5561* (2013.01); *H04B 2210/517* (2013.01); *H04B 10/5051* (2013.01); *H04B 10/5162* (2013.01); *H04B 10/5053* (2013.01)
USPC ........... 398/188; 398/140; 398/164; 398/182; 398/183

(58) Field of Classification Search
CPC .. H04B 10/50; H04B 10/505; H04B 10/5051; H04B 10/5053; H04B 10/5055; H04B 10/5162; H04B 10/548; H04B 10/556; H04B 10/5561; H04B 10/516; H04B 2210/517
See application file for complete search history.

(56) References Cited

U.S. PATENT DOCUMENTS

| | | |
|---|---|---|
| 7,346,283 B2 | 3/2008 | Kao et al. |
| 7,720,392 B2 | 5/2010 | Nakashima et al. |

(Continued)

FOREIGN PATENT DOCUMENTS

| | | |
|---|---|---|
| CN | 1507178 A | 6/2004 |
| CN | 101527601 A | 9/2009 |

(Continued)

OTHER PUBLICATIONS

Extended Search Report of corresponding European Patent Application No. 09765345.5, mailed Jan. 19, 2012, 6 pages total.

(Continued)

*Primary Examiner* — Darren E Wolf
(74) *Attorney, Agent, or Firm* — Brinks Gilson & Lione (57) ABSTRACT

The method includes: receiving a first Non Return to Zero (NRZ) data signal and a synchronous clock signal, and performing Return to Zero (RZ) processing to generate a first complementary RZ data signal pair; receiving a second NRZ data signal and a synchronous clock signal, and performing RZ processing to generate a second complementary RZ data signal pair; and modulating the first complementary RZ data signal pair and the second complementary RZ data signal pair on light to generate an RZ-Differential Quadrature Phase Shift Keying (RZ-DQPSK) optical signal. Through the method and device, RZ processing are performed on the NRZ data signals to generate the complementary RZ data signal pairs, and the complementary RZ data signal pairs are modulated on the light, thereby reducing the cost and the insertion loss of the entire device, lowering the requirements for input optical power and reducing the complexity of loop circuit control.

15 Claims, 4 Drawing Sheets

(56) References Cited

U.S. PATENT DOCUMENTS

| | | | |
|---|---|---|---|
| 7,840,141 B2 | 11/2010 | Tanaka et al. | |
| 7,885,550 B2 | 2/2011 | Oberland | |
| 2002/0196508 A1* | 12/2002 | Wei et al. | 359/183 |
| 2006/0008278 A1* | 1/2006 | Kao et al. | 398/188 |
| 2007/0086787 A1 | 4/2007 | Cho et al. | |
| 2007/0177882 A1 | 8/2007 | Akiyama | |

FOREIGN PATENT DOCUMENTS

| | | |
|---|---|---|
| EP | 1612972 A1 | 1/2006 |
| EP | 1816763 A1 | 8/2007 |
| EP | 1923739 A1 | 5/2008 |

OTHER PUBLICATIONS

International search report for the corresponding International application No. PCT/CN2009/071267, Jul. 23, 2009, 21 pages.

Office Action issued in corresponding Chinese Patent Application No. 200810128734.2, mailed Nov. 20, 2012.

First Office Action of corresponding Chinese Patent Application No. 200810128734.2, mailed Oct. 21, 2011, and English translation thereof, 16 pages total.

Written Opinion of corresponding PCT Patent Application No. PCT/CN2009/071267, mailed Jul. 23, 2009, 3 pages total.

Second office action of corresponding Chinese Patent Application No. 200810128734.2, mailed on May 23, 2012, and English translations thereof, 13 pages total.

\* cited by examiner

METHOD AND DEVICE FOR GENERATING OPTICAL SIGNALS

CROSS-REFERENCE TO RELATED APPLICATIONS

This application is a continuation of International Application No. PCT/CN2009/071267, filed on Apr. 15, 2009, which claims priority to Chinese Patent Application No. 200810128734.2, filed on Jun. 20, 2008, both of which are hereby incorporated by reference in their entireties.

FIELD OF THE TECHNOLOGY

The present invention relates to the field of communications, and more particularly to a method and device for generating optical signals.

BACKGROUND OF THE INVENTION

With the increasing demand for optical network capacity, the service transmission rate is developing from 10 Gb/s rate of current networks to 40 Gb/s and even 100 Gb/s. In high-speed optical transmission systems, selection of an optical modulation format is critical in the whole system. The optical modulation format is directly correlated to the properties of the optical transmission system such as transmission performance, spectral efficiency, nonlinear tolerance, and dispersion tolerance.

As a novel modulation format, a Return to Zero-Differential Quadrature Phase Shift Keying (RZ-DQPSK) modulation format has a narrow spectral width, can effectively inhibit nonlinear effects of various optical fibers and improve the tolerance to chromatic dispersion and polarization mode dispersion, and becomes an important modulation mode for long-distance high-speed large-capacity optical transmission.

Figure 1:
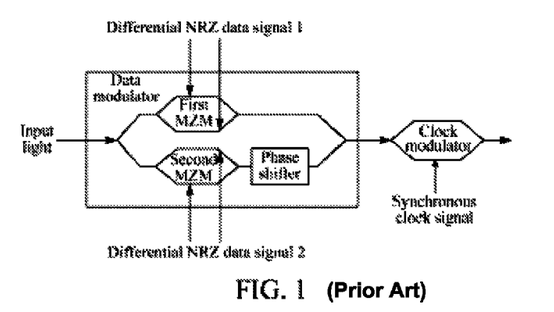
FIG. 1 shows a device for generating RZ-DQPSK optical signals in the prior art.
Figure 2:
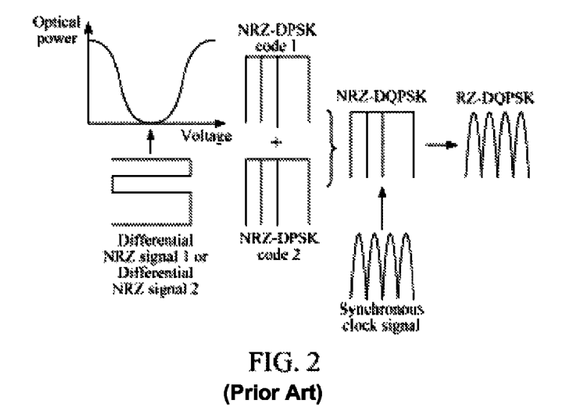
FIG. 2 is a flow chart of generation of an RZ-DQPSK optical signal in the prior art.

FIG. 1 shows a device for generating RZ-DQPSK optical signals in the prior art. As shown in FIG. 1, an RZ-DQPSK optical signal is generated through two stages of modulators. The first stage is a data modulator, including two differential Mach-Zender Modulators (MZMs) and a $\pi/2$ phase shifter; and the second stage is a clock modulator. FIG. 2 is a flow chart of generation of an RZ-DQPSK optical signal in the prior art, which includes the following steps. A first MZM is loaded with an NRZ signal 1 to generate a Non Return to Zero-Differential Phase Shift Keying (NRZ-DPSK) code 1, and similarly, a second MZM generates an NRZ-DPSK code 2. The NRZ-DPSK code 1 and the NRZ-DPSK code 2 pass through a $\pi/2$ phase shifter, and are combined into an NRZ-DQPSK optical signal. The clock modulator is loaded with a synchronous clock signal, and generates an NRZ pulse envelope as driven by the clock signal, and cut the pulse of the NRZ-DQPSK signal to generate an RZ-DQPSK optical signal. Another solution in the prior art is to reverse the order of the first stage modulator and the second stage modulator to generate an RZ-DQPSK optical signal.

In the implementation of the present invention, the inventor found that the prior art has at least the following problems.

In the prior art, the two stages of modulators are used to generate the RZ-DQPSK optical signal, which results in complex structure, high costs, and large volume of the device for generating optical signals. Meanwhile, the clock modulator increases the overall insertion loss (that is, a ratio of the output optical power to the input optical power) of the modulators, and in order to maintain the output optical power unchanged, the requirements for the input optical power are increased. The clock modulator needs to control a bias point, which increases the complexity of loop circuit control. In addition, the phase of the clock must be synchronous with that of the data signal, but the synchronization control method is complex.

SUMMARY OF THE INVENTION

In order to simplify the structure of the device for generating optical signals, reduce the costs and the insertion loss of the entire device, lower the requirements for input optical power and reduce the complexity of loop circuit control, the present invention is directed to a method and device for generating optical signals. The technical solution is as follows.

A method for generating optical signals is provided, which includes the following steps.

A first NRZ data signal and a synchronous clock signal are received, and RZ processing is performed to generate a first complementary RZ data signal pair.

A second NRZ data signal and a synchronous clock signal are received, and RZ processing is performed to generate a second complementary RZ data signal pair.

The first complementary RZ data signal pair and the second complementary RZ data signal pair are modulated on light to generate an RZ-DQPSK optical signal.

A device for generating optical signals is provided, which includes a signal processing module and a modulator.

The signal processing module is configured to receive a first NRZ data signal and a synchronous clock signal, and perform RZ processing to generate a first complementary RZ data signal pair; and receive a second NRZ data signal and a synchronous clock signal, and perform RZ processing to generate a second complementary RZ data signal pair.

The modulator is configured to receive input light, the first complementary RZ data signal pair, and the second complementary RZ data signal pair, and modulate the first complementary RZ data signal pair and the second complementary RZ data signal pair on the light to generate an RZ-DQPSK optical signal.

The technical solution of the present invention has the following beneficial effects.

RZ processing is performed on the NRZ data signals to generate a pair of complementary RZ data signal pairs, and the two RZ data signal pairs are modulated on light to generate an RZ-DQPSK optical signal without adding a clock modulator to cut the pulse of the NRZ-DQPSK signal to generate the RZ-DQPSK optical signal, so that the structural complexity and the cost of the device for generating optical signals are reduced, and at the same time, the insertion loss caused by the clock modulator is reduced, and the requirements for input optical power are lowered. Since no clock modulator is added in the present invention, the control of the bias point of the clock modulator is not required, so that the complexity of control caused by the clock modulator is reduced. Meanwhile, since no clock synchronization control caused by the clock modulator is involved, the complexity of synchronization control is reduced.

DETAILED DESCRIPTION OF THE EMBODIMENTS

To make the technical solution, objectives and merits of the present invention clearer, the embodiments of the present invention is described in detail with reference to accompanying drawings.

According to the embodiments of the present invention, a first NRZ data signal and a synchronous clock signal are received, and RZ processing is performed to generate a first complementary RZ data signal pair; a second NRZ data signal and a synchronous clock signal are received, and RZ processing is performed to generate a second complementary RZ data signal pair; and the first complementary RZ data signal pair and the second complementary RZ data signal pair are modulated on light to generate an RZ-DQPSK optical signal.

Embodiment 1

In this embodiment, two differential amplifiers respectively receive an NRZ data signal and a synchronous clock signal, and perform RZ processing on the two NRZ data signals to generate two RZ data signal pairs, where each pair of RZ data signals contain two complementary RZ data signals. At the same time, the two RZ data signal pairs are loaded onto a modulator to modulate light input into the modulator, so as to generate an RZ-DQPSK optical signal.

It should be noted that, although in this embodiment, two differential amplifiers are used to respectively receive an NRZ data signal and a synchronous clock signal and perform RZ processing on the two NRZ data signals, other manners may also be adopted, for example, two logic circuit units (for example, a combination of an AND gate and an OR gate) are used to respectively perform RZ processing on the two NRZ data signals, or an integrated differential amplifier or a logic circuit is used to load a synchronous clock signal for the two NRZ data signals and perform RZ processing. The principle of the logic circuit unit is similar to that of the differential amplifier, and the principle of the logic circuit is similar to that of the integrated differential amplifier, which will not be described in detail in this embodiment.

Figure 3:
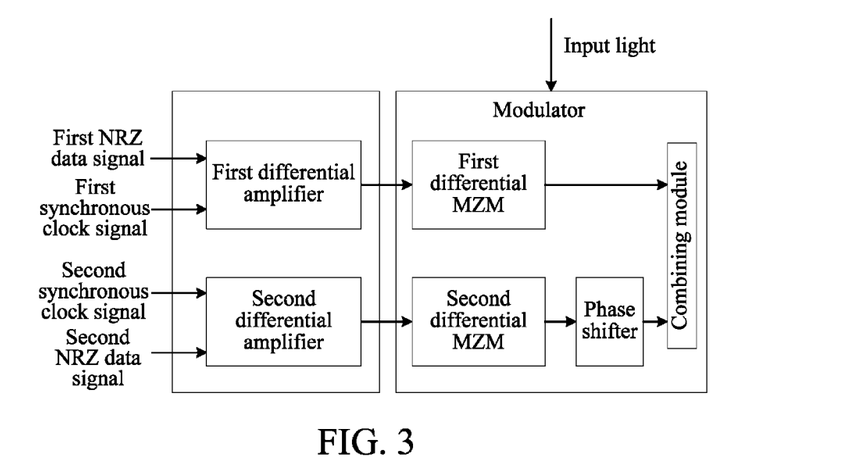
FIG. 3 is a schematic view of generation of an optical signal according to a first embodiment of the present invention.

In this embodiment, taking a schematic view of generation of an optical signal shown in FIG. 3 as an example, two differential amplifiers are used to respectively load two synchronous clock signals for two NRZ data signals, and perform RZ processing. In FIG. 3, a first differential amplifier, a second differential amplifier, and a modulator are included. The modulator includes a first differential MZM, a second differential MZM, a phase shifter, and a combining module.

Figure 4:
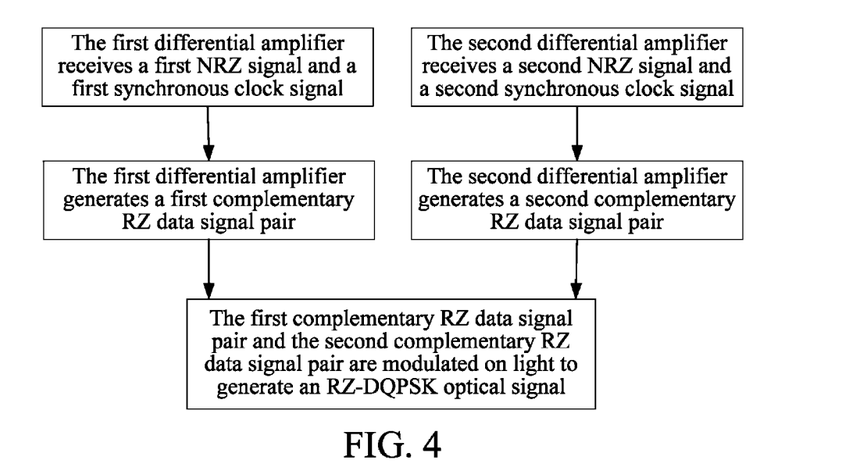
FIG. 4 is a flow chart of a method for generating optical signals according to the first embodiment of the present invention.

FIG. 4 shows a method for generating optical signals according to the first embodiment of the present invention. As shown in FIG. 4, the method includes the following steps.

The first differential amplifier receives a first NRZ data signal and a first synchronous clock signal.

The first NRZ data signal is an electrical signal including "0" and "1" data information. The first synchronous clock signal is an electrical signal, which is an RZ pulse sequence with a waveform of all "1"s. The first synchronous clock signal is synchronous with the first NRZ data signal, and the term "synchronous" means that the clock signal and the data signal have the same frequency and the same initial phase. Specifically, synchronization of the first synchronous clock signal and the first NRZ data signal may be implemented by performing clock data recovery (CDR) through an existing phase lock loop (PLL) circuit, and by using the technique, a clock signal of the same frequency and the same phase can be recovered from the data signal, and thus synchronization of the data signal and the clock signal is achieved. It should be understood that, the implementation of the synchronization of the data signal and the clock signal is not limited to the above circuit or technique.

The first differential amplifier performs RZ processing on the first NRZ data signal and the first synchronous clock signal to generate a first complementary RZ data signal pair.

Specifically, since the first synchronous clock signal in this embodiment is an RZ pulse sequence with a waveform of all "1"s, the synchronous clock signal has the characteristics of RZ. At the same time, the first NRZ data signal and the first synchronous clock signal are subjected to an operation of an internal circuit of the differential amplifier, and a pair of complementary RZ data signals are output. The pair of complementary RZ data signals is an electrical data signal including two RZ data signals. The terms "complementary" means that when the first RZ data signal is "0", the second RZ data signal is "1" accordingly; and similarly, when the first RZ data signal is "1", the second RZ data signal is "0" accordingly.

The second differential amplifier receives a second NRZ data signal and a second synchronous clock signal.

The principle of receiving the second NRZ data signal and the second synchronous clock signal by the second differential amplifier is similar to that of receiving the first NRZ data signal and the first synchronous clock signal by the first differential amplifier, where the second NRZ data signal and the first NRZ data signal may carry the same data information or different data information.

The second synchronous clock signal and the first synchronous clock signal may be generated by the same clock source or different clock sources. When different clock sources are used, the first synchronous clock signal and the second synchronous clock signal need to be synchronized (that is, the two clock signals have the same frequency and the same phase), and the synchronization of the signals may be performed by controlling starting points of the clock sources by a logic circuit.

The second differential amplifier performs RZ processing on the second NRZ data signal and the second synchronous clock signal to generate a second complementary RZ data signal pair.

The principle of performing RZ processing on the second NRZ data signal and the second synchronous clock signal by the second differential amplifier to generate the second complementary RZ data signal pair is the same as that of performing RZ processing on the first NRZ data signal and the first synchronous clock signal by the first differential amplifier to generate the first complementary RZ data signal pair, so the details will not be described herein again.

The first complementary RZ data signal pair and the second complementary RZ data signal pair are modulated on light by a modulator to generate an RZ-DQPSK optical signal.

The modulator includes a first differential MZM, a second differential MZM, a π/2 phase shifter, and a combining module. The first complementary RZ data signal pair is loaded onto two arms of the first differential MZM simultaneously. As for a modulation curve in the first differential MZM, the first complementary RZ data signal pair is loaded at the same time. A combined drive voltage is equal to a voltage difference of the first complementary RZ data signal pair, that is, the signals are combined into a first electrical RZ driving signal having a level of "1" and "−1". The electrical RZ driving signal drives the first differential MZM to modulate one beam of light input into the first differential MZM after being split, so as to generate a first RZ-DPSK data signal, which is an optical signal. Similarly, the second complementary RZ data signal pair is loaded onto two arms of the second differential MZM, and the other beam of the light after being split is modulated by the second differential MZM, so as to generate a second RZ-DPSK data signal. The two beams have the same optical power.

One of the first RZ-DPSK data signal and the second RZ-DPSK data signal is phase-shifted by the π/2 phase shifter, and the phase-shifted RZ-DPSK data signal and the RZ-DPSK data signal that is not phase-shifted are combined by the combining module to generate an RZ-DQPSK data signal, which is an optical signal.

Figure 5:
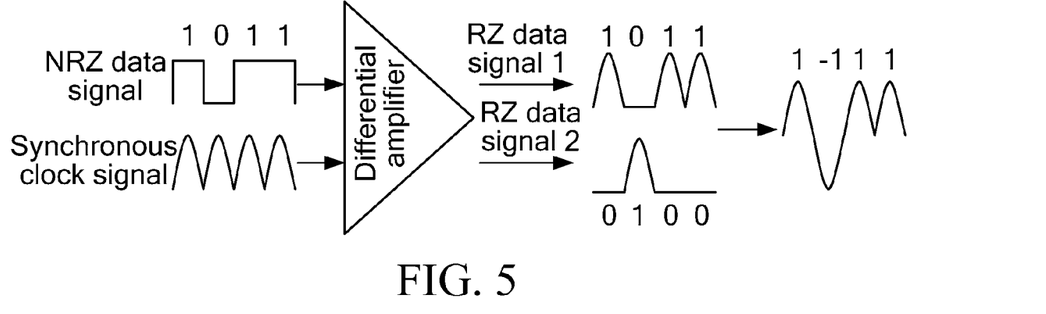
FIG. 5 is a schematic flow chart of generation of a complementary RZ data signal pair according to the first embodiment of the present invention.

According to the solution of this embodiment, FIG. 5 provides the principle of generation of a complementary RZ data signal pair by taking a specific NRZ data signal as an example. As shown in FIG. 5, the NRZ data signal and the synchronous clock signal are input into the differential amplifier simultaneously, and data information carried by the NRZ data signal is "1 0 1 1". A complementary RZ data signal pair is generated by an internal differential structure of the differential amplifier. Data information carried by an RZ data signal 1 is the same as the data information carried by the input NRZ data signal and is "1 0 1 1"; and the other RZ data signal 2 is complementary to the RZ data signal 1, and data information carried by the RZ data signal 2 is "0 1 0 0". The two complementary RZ data signals are loaded onto two arms of the differential MZM simultaneously, and as for a modulation curve in the differential MZM, it is equivalent to loading a combined RZ drive voltage, and the waveform of the RZ drive voltage is as the last waveform shown in FIG. 5. Data information carried by the RZ drive voltage is the same as the data information of the initially input NRZ data signal (that is, "1 0 1 1"), but the level of the drive voltage is changed to "1 −1 1 1". According to the differential driving principle of MZM, the waveform is formed by phase-reversing the waveform of an RZ data signal carrying the data information complementary to that carried by the NRZ data signal and then superposing on the waveform of an RZ data signal carrying the same data information as that carried by the NRZ data signal, and thus an electrical RZ driving signal, that is, the RZ drive voltage is generated.

Figure 6:
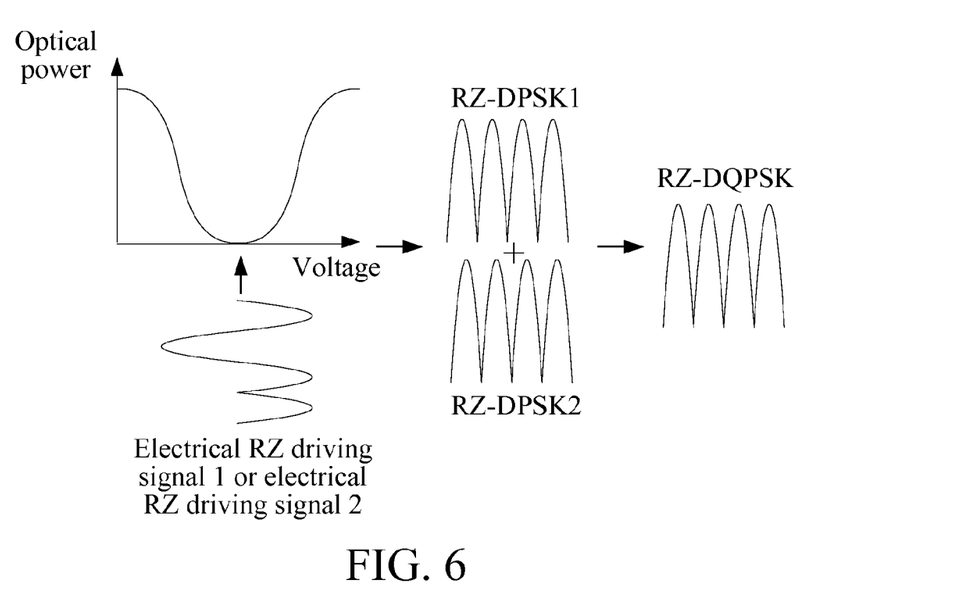
FIG. 6 is a schematic flow chart of generation of an RZ-DQPSK signal according to the first embodiment of the present invention.

FIG. 6 is a schematic flow chart of generation of an RZ-DQPSK signal. As shown in FIG. 6, the complementary RZ data signal pair generated in FIG. 5 is loaded onto the differential MZM, which is equivalent to that the combined electrical RZ driving signal modulates the light input into the differential MZM, to generate an RZ-DPSK optical data signal; and similarly, another RZ-DPSK optical data signal is generated. One RZ-DPSK optical data signal is phase-shifted by the π/2 phase shifter, and then the two RZ-DPSK optical data signals are combined to generate an RZ-DQPSK optical data signal.

In this embodiment, RZ processing is performed on the NRZ data signals to generate a pair of complementary RZ data signal pairs, and the two RZ data signal pairs are modulated on light to generate an RZ-DQPSK optical signal without adding a clock modulator to cut the pulse of the NRZ-DQPSK signal to generate the RZ-DQPSK optical signal, so that the structural complexity and the cost of the device for generating optical signals are reduced, and at the same time, the insertion loss caused by the clock modulator is reduced, and the requirements for input optical power are lowered. In the prior art, electrical drive signals are loaded onto a modulation curve by modulators, and all the modulators including the clock modulator need to control the bias point, while the control of the bias point belongs to phase control, and the clock modulator needs to control the bias point at a correct position, so as to work normally; however, since the bias point may drift, the complexity of control for the bias point control of the clock modulator is increased. In this embodiment, since no clock modulator is added, the control of the bias point of the clock modulator is not required, so that the complexity of control caused by the clock modulator is reduced. Meanwhile, in the prior art, the clock modulator serving as the second stage modulator needs to synchronize the clock signal with the optical signal output by the first stage modulator when loading the clock signal, that is, the synchronization of the clock modulator is synchronizing the optical signal; however, compared with the synchronization of the electrical signal, the method for controlling the synchronization of the optical signal is complex. Since no clock modulator is used in this embodiment, no synchronization control of the optical signal is involved, so that the complexity of synchronization control is reduced.

Embodiment 2

Figure 7:
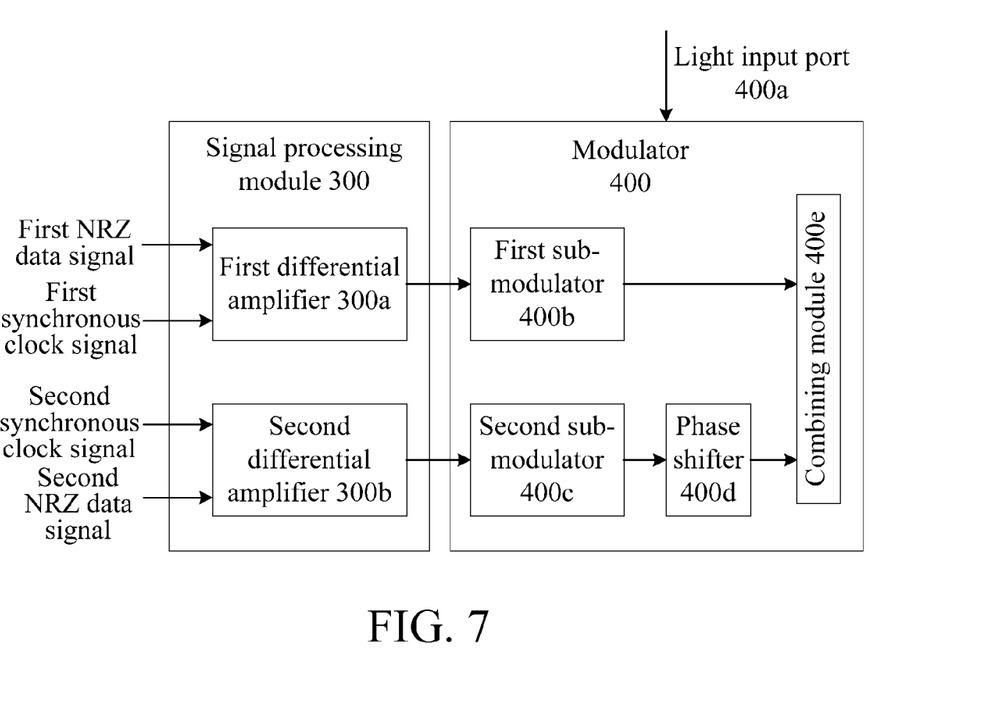
FIG. 7 is a schematic structural view of a device for generating optical signals according to a second embodiment of the present invention.

FIG. 7 shows a device for generating optical signals according to a second embodiment of the present invention. As shown in FIG. 7, the device includes a signal processing module 300 and a modulator 400.

The signal processing module 300 is configured to receive a first NRZ data signal and a synchronous clock signal, perform RZ processing to generate a first complementary RZ data signal pair, and output the first complementary RZ data signal pair; and receive a second NRZ data signal and a synchronous clock signal, perform RZ processing to generate a second complementary RZ data signal pair, and output the second complementary RZ data signal pair.

The modulator 400 is configured to receive input light, the first complementary RZ data signal pair, and the second complementary RZ data signal pair, and modulate the first complementary RZ data signal pair and the second complementary RZ data signal pair on the light to generate an RZ-DQPSK optical signal.

The signal processing module 300 includes a first differential amplifier 300a, configured to receive the first NRZ data signal and a first synchronous clock signal, perform RZ processing to generate the first complementary RZ data signal pair, and output the first complementary RZ data signal pair.

The signal processing module 300 further includes a second differential amplifier 300b, configured to receive the second NRZ data signal and a second synchronous clock signal, perform RZ processing to generate the second complementary RZ data signal pair, and output the second complementary RZ data signal pair.

The signal processing module 300 may also include a first logic circuit unit and a second logic circuit unit.

The first logic circuit unit is configured to receive the first NRZ data signal and a first synchronous clock signal, perform RZ processing to generate the first complementary RZ data signal pair, and output the first complementary RZ data signal pair.

The second logic circuit unit is configured to receive the second NRZ data signal and a second synchronous clock signal, perform RZ processing to generate the second complementary RZ data signal pair, and output the second complementary RZ data signal pair.

The modulator 400 includes a light input port 400a, a first sub-modulator 400b, a second sub-modulator 400c, a phase shifter 400d, and a combining module 400e.

The light input port 400a is configured to receive light, and split the light into two beams.

The light input port 400a splits the light into two beams, and the two beams have the same optical power.

The first sub-modulator 400b is configured to receive one beam from the light input port 400a and the first complementary RZ data signal pair output by the signal processing module 300, modulate the first complementary RZ data signal pair on the beam to generate a first RZ-DPSK signal, and output the first RZ-DPSK signal.

The second sub-modulator 400c is configured to receive the other beam from the light input port 400a and the second complementary RZ data signal pair output by the signal processing module 300, modulate the second complementary RZ data signal pair on the other beam to generate a second RZ-DPSK signal, and output the second RZ-DPSK signal.

The phase shifter 400d is configured to perform a $\pi/2$-phase shift on the second RZ-DPSK signal.

The combining module 400e is configured to receive the first RZ-DPSK signal output by the first sub-modulator 400b and the phase-shifted second RZ-DPSK signal output by the phase shifter 400d, and combine the two RZ-DPSK signals to generate an RZ-DQPSK optical signal.

In the implementation of this embodiment, the combining module 400e is located in the modulator 400, and achieves the function of combining two signals into one signal through a medium capable of transmitting light.

The first sub-modulator 400b and the second sub-modulator 400c may be implemented by differential MZMs.

The device for generating optical signals according to this embodiment further includes a clock source, configured to generate the first synchronous clock signal and the second synchronous clock signal, where the first synchronous clock signal is synchronous with the first NRZ data signal, the second synchronous clock signal is synchronous with the second NRZ data signal, and the first synchronous clock signal is synchronous with the second synchronous clock signal.

In this embodiment, the first differential amplifier 300a is used to perform RZ processing on the NRZ data signals to generate the first complementary RZ data signal pair, the second differential amplifier 300b is used to perform RZ processing on the NRZ data signals to generate the second complementary RZ data signal pair, and the two RZ data signal pairs are modulated on light by the modulator 400 to generate an RZ-DQPSK optical signal without adding a clock modulator to cut the pulse of the NRZ-DQPSK signal to generate the RZ-DQPSK optical signal, so that the structural complexity and the cost of the device for generating optical signals are reduced, and at the same time, the insertion loss caused by the clock modulator is reduced, and the requirements for input optical power are lowered. Since no clock modulator is added in this embodiment, the control of the bias point of the clock modulator is not required, so that the complexity of control caused by the clock modulator is reduced. Meanwhile, since no clock synchronization control caused by the clock modulator is involved, the complexity of synchronization control is reduced.

Embodiment 3

In this embodiment, a device for generating optical signals is provided. The difference between this embodiment and the previous embodiment lies in that the signal processing module is an integrated differential amplifier, and the integrated differential amplifier receives a first NRZ data signal, a second NRZ data signal, and a synchronous clock signal simultaneously, where the three signals are synchronous (that is, the three signals have the same frequency and the same initial phase). It should be noted that, the synchronization of the three signals may be implemented by performing CDR through an existing PLL circuit. The three signals pass through the integrated differential amplifier, and according to the differential principle in the integrated differential amplifier, a first complementary RZ data signal pair and a second complementary RZ data signal pair are generated simultaneously, that is, one integrated differential amplifier achieves the functions of two differential amplifiers in the second embodiment. Then, the first complementary RZ data signal pair and the second complementary RZ data signal pair are loaded onto two differential MZMs respectively, and modulated by the differential MZMs, and finally, an RZ-DQPSK optical data signal is generated. The principle is similar to that in the previous embodiment, so the details will not be described herein again.

The signal processing module may also be a logic circuit, and the function of the logic circuit is similar to that of the integrated differential amplifier, that is, one logic circuit achieves the functions of two logic circuit units in the second embodiment, so the details will not be described herein again.

The device for generating optical signals according to this embodiment further includes a clock source, configured to generate a third synchronous clock signal, where the third synchronous clock signal is synchronous with the first NRZ data signal and the second NRZ data signal.

Besides the effects of the second embodiment, according to this embodiment, the integrated differential amplifier performs RZ processing on the two NRZ data signals at the same time, that is, one integrated differential amplifier achieves the functions of two differential amplifiers, so that the structural complexity of the device for generating optical signals is significantly reduced.

The above descriptions are merely some exemplary embodiments of the present invention, but not intended to limit the scope of the present invention. Any modification, equivalent replacement, or improvement made without departing from the spirit and principle of the present invention should fall within the scope of the present invention.

What is claimed is:

1. A method for generating optical signals, comprising:
a first differential amplifier directly receiving a first non-differential Non Return to Zero (NRZ) data signal and a first synchronous clock signal, wherein the first differential amplifier performing Return to Zero (RZ) processing to generate a first complementary RZ data signal pair;
a second differential amplifier directly receiving a second non-differential NRZ data signal and a second synchronous clock signal, wherein the second differential amplifier performing RZ processing to generate a second complementary RZ data signal pair; and modulating the first complementary RZ data signal pair and the second complementary RZ data signal pair on light to generate an RZ-Differential Quadrature Phase Shift Keying (RZ-DQPSK) optical signal.

2. The method for generating optical signals according to claim 1, wherein the first synchronous clock signal and the second synchronous clock signal are not synchronous to each other.

3. The method for generating optical signals according to claim 1, wherein the first synchronous clock signal is synchronous with the second synchronous clock signal.

4. The method for generating optical signals according to claim 1, wherein the first synchronous clock signal and the second synchronous clock signal is synchronous with a third clock signal.

5. The method for generating optical signals according to claim 1, wherein the modulating the first complementary RZ data signal pair and the second complementary RZ data signal pair on the light comprises:

receiving the light, and splitting the light into two beams;

modulating the first complementary RZ data signal pair on one beam to generate a first RZ-Differential Phase Shift Keying (RZ-DPSK) signal;

modulating the second complementary RZ data signal pair on the other beam to generate a second RZ-DPSK signal; and phase-shifting the first RZ-DPSK signal or the second RZ-DPSK signal, and combining the first and the second RZ-DPSK signals to generate the RZ-DQPSK optical signal.

6. A device for generating optical signals, comprising:

a signal processing module, wherein:

a first differential amplifier directly receives a first non-differential Non Return to Zero (NRZ) data signal and a first synchronous clock signal, the first differential amplifier performs Return to Zero (RZ) processing to generate a first complementary RZ data signal pair, and output the first complementary RZ data signal pair;

a second differential amplifier directly receives a second non-differential NRZ data signal and a second synchronous clock signal, the second differential amplifier performs RZ processing to generate a second complementary RZ data signal pair, and output the second complementary RZ data signal pair; and a modulator, configured to receive input light, the first complementary RZ data signal pair, and the second complementary RZ data signal pair, and modulate the first complementary RZ data signal pair and the second complementary RZ data signal pair on the light to generate an RZ-Differential Quadrature Phase Shift Keying (RZ-DQPSK) optical signal.

7. The device for generating optical signals according to claim 6, wherein the signal processing module comprises:

a first logic circuit unit, configured to receive the first non-differential NRZ data signal and the first synchronous clock signal, perform RZ processing to generate the first complementary RZ data signal pair, and output the first complementary RZ data signal pair; and a second logic circuit unit, configured to receive the second non-differential NRZ data signal and the second synchronous clock signal, perform RZ processing to generate the second complementary RZ data signal pair, and output the second complementary RZ data signal pair.

8. The device for generating optical signals according to claim 6, wherein the signal processing module comprises an integrated differential amplifier, configured to receive the first non-differential NRZ data signal, the second non-differential NRZ data signal, and a third synchronous clock signal, perform RZ processing to generate the first complementary RZ data signal pair and the second complementary RZ data signal pair, and output the first complementary RZ data signal pair and the second complementary RZ data signal pair.

9. The device for generating optical signals according to claim 6, wherein the signal processing module comprises a logic circuit, configured to receive the first non-differential NRZ data signal, the second non-differential NRZ data signal, and a third synchronous clock signal, perform RZ processing to generate the first complementary RZ data signal pair and the second complementary RZ data signal pair, and output the first complementary RZ data signal pair and the second complementary RZ data signal pair.

10. The device for generating optical signals according to claim 6, wherein the modulator comprises:

a light input port, configured to receive the light, and split the light into two beams;

a first sub-modulator, configured to receive one beam from the light input port and the first complementary RZ data signal pair output by the signal processing module, modulate the first complementary RZ data signal pair on the beam to generate a first RZ-Differential Phase Shift Keying (RZ-DPSK) signal, and output the first RZ-DPSK signal;

a second sub-modulator, configured to receive the other beam from the light input port and the second complementary RZ data signal pair output by the signal processing module, modulate the second complementary RZ data signal pair on the other beam to generate a second RZ-DPSK signal, and output the second RZ-DPSK signal;

a phase shifter, configured to phase-shift the second RZ-DPSK signal; and a combining module, configured to receive the first RZ-DPSK signal output by the first sub-modulator and the phase-shifted second RZ-DPSK signal output by the phase shifter, and combine the two RZ-DPSK signals to generate the RZ-DQPSK optical signal.

11. The device for generating optical signals according to claim 6, further comprising a clock source, configured to generate the first and the second synchronous clock signals.

12. The device for generating optical signals according to claim 6, further comprising:

a clock source, configured to generate the first synchronous clock signal and the second synchronous clock signal, wherein the first synchronous clock signal is synchronous with the second synchronous clock signal.

13. The device for generating optical signals according to claim 7, further comprising a clock source, configured to generate the first synchronous clock signal and the second synchronous clock signal, wherein the first synchronous clock signal is synchronous with the second synchronous clock signal.

14. The device for generating optical signals according to claim 8, further comprising a clock source, configured to generate the third synchronous clock signal, wherein the third synchronous clock signal is synchronous with the first NRZ data signal and the second NRZ data signal.

15. The device for generating optical signals according to claim 9, further comprising a clock source, configured to generate the third synchronous clock signal, wherein the third synchronous clock signal is synchronous with the first NRZ data signal and the second NRZ data signal.

* * * * *